United States Patent

Krambeck et al.

[11] Patent Number: 6,058,688
[45] Date of Patent: *May 9, 2000

[54] WINDROWER SPECIALTY CROP PLATFORM HAVING RIGHT- AND LEFT-HAND CANTILEVERED AUGERS LOCATED BENEATH A FULL-LENGTH CENTER-FEED AUGER

[75] Inventors: Frederick Carl Krambeck; Melvin William Keller, both of Ottumwa, Iowa

[73] Assignee: Deere & Company, Moline, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/076,040

[22] Filed: May 8, 1998

[51] Int. Cl.⁷ ...................................................... A01D 34/00
[52] U.S. Cl. .................... 56/14.5; 56/DIG. 1; 56/192; 56/10.2 R
[58] Field of Search ........................ 56/192, 14.5, 10.2 R

[56] References Cited

U.S. PATENT DOCUMENTS

| | | | |
|---|---|---|---|
| 1,733,839 | 10/1929 | Taylor | 56/16.4 R |
| 3,324,639 | 6/1967 | Halls et al. | 56/14.4 |
| 3,412,535 | 11/1968 | Drummond | 56/14.5 |
| 3,503,190 | 3/1970 | Van Der Lely | 56/13.6 |
| 3,555,796 | 1/1971 | Baumeister | 56/221 |
| 3,780,506 | 12/1973 | Tashiro | 56/14.5 |
| 3,982,383 | 9/1976 | Mott | 56/11.6 |
| 4,185,445 | 1/1980 | Van Der Lely | 56/192 |
| 4,473,993 | 10/1984 | Jennings et al. | 56/192 |
| 4,550,554 | 11/1985 | Lundahl et al. | 56/294 |
| 4,637,201 | 1/1987 | Pruit et al. | 56/14.5 |
| 4,747,260 | 5/1988 | Petrasch et al. | 56/14.5 |
| 5,005,342 | 4/1991 | Lundahl et al. | 56/10.2 |
| 5,778,644 | 7/1998 | Keller et al. | 56/11.2 |

*Primary Examiner*—Thomas B. Will
*Assistant Examiner*—Arpad Fabian Kovacs

[57] ABSTRACT

A windrower platform is constructed with a full-length, upper center-feed auger which counter rotates relative to and cooperates with lower, right- and left-hand cantilever-mounted augers to convey harvested crop to form a windrow on the ground at a central discharge zone of the platform. The various driven elements of the platform are driven from a main power distribution gear box having an input shaft coupled for being driven by a reversible hydraulic fluid motor. The upper auger is used for transmitting power to the opposite side of the platform from the main power distribution gear box and a transmission assembly is provided at this opposite side for driving the lower right-hand auger in a direction opposite to that of the upper auger.

3 Claims, 6 Drawing Sheets

WINDROWER SPECIALTY CROP PLATFORM HAVING RIGHT- AND LEFT-HAND CANTILEVERED AUGERS LOCATED BENEATH A FULL-LENGTH CENTER-FEED AUGER

BACKGROUND OF THE INVENTION

The present invention relates to a windrower platform for severing crop from the ground and forming a windrow of cut crop and more specifically relates to an auger arrangement for gathering the crop for forming the windrow.

It is sometimes necessary to cut and windrow a seed or specialty crop so that it dries a desired amount before being introduced into a combine which removes the seed from the stems. Various grass seeds are harvested in this manner. It was found that a windrower platform equipped with upper and lower full-length, counter-rotating crop-centering augers was not entirely satisfactory since short grasses and very long grasses had a tendency of wrapping on the center of the augers. When wrappage of the crop occurs, the platform ceases to function requiring the operator to stop and unwrap the auger(s). Furthermore, when the crop begins to bunch up, seed is lost since the reel will strike the bunched crop. Also, in some conditions, the crop tended not to be fed consistently to the windrow resulting in clumps which were difficult for the combine to thresh requiring the combine to be operated at reduced ground speeds in order to prevent the loss of more seed.

It is known to use a windrower having a platform equipped with first and second sets of overshot augers arranged one ahead of the other, with the augers on the opposite sides of each set having flighting of opposite hand so that cut crop falls onto the sets of augers and is conveyed to the center of the platform and deposited on the ground in a windrow. U.S. Pat. No. 3,412,535, granted to Drummond on Nov. 26, 1968, discloses a platform of this type. In order to keep crop from feeding over the rear set of augers, which might happen when cutting a relatively tall crop, it is known to provide a full-length upper auger in combination with the two sets of right- and left-hand augers, with the position of the upper auger being rearward and above the second set of augers and with its direction of rotation being opposite to that of the two sets of augers. Using two sets of augers has the disadvantage of being relatively heavy and of not being compact in the fore-and-aft direction.

SUMMARY OF THE INVENTION

According to the present invention, there is provided an improved platform for harvesting seed or specialty crops and depositing them on the ground in a windrow for being processed by a pick-up equipped combine or ensilage harvester.

An object of the invention is to provide a crop harvesting platform which efficiently gathers the crop from the cutterbar to a central discharge zone and there deposits the crop evenly to form a uniform windrow.

A more specific object of the invention is to provide a platform which uses a single set of right- and left-hand lower augers in conjunction with an upper full-length auger which is disposed substantially vertically above the lower set of augers.

Still another object of the invention is to provide a crop harvesting platform, as set forth above, wherein the set of right- and left-hand lower augers are cantilever-mounted.

Another object of the invention, is to provide a set of cantilever-mounted augers, as set forth in the immediately preceding object, wherein a stub shaft extends within and is fixed to an outer end portion of a center tube of each auger of the set of augers and the outer portion of each shaft is supported in a set of inner and outer bearings, with at least the outer bearing being self-aligning.

Yet another object of the invention is to provide a crop harvesting platform, as set forth above, wherein the drive for one auger of the set of lower augers includes the upper, full-length auger.

These and other objects of the invention will become apparent from a reading of the ensuing description together with the appended drawings.

DESCRIPTION OF THE PREFERRED EMBODIMENT

Figure 1:
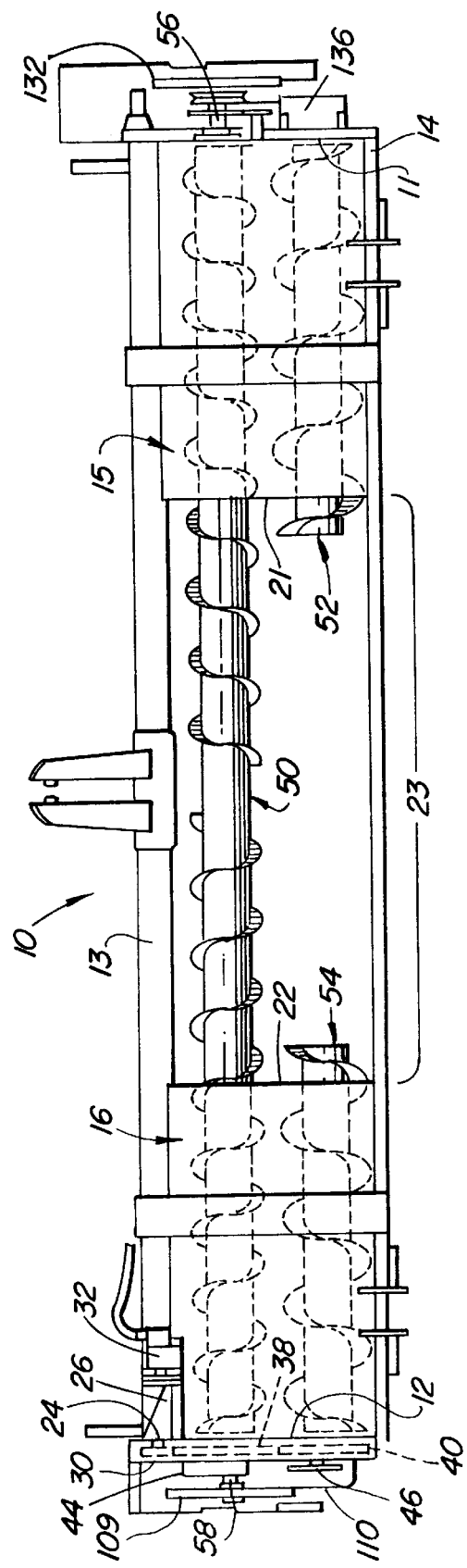
FIG. 1 is a somewhat schematic, rear elevational view of a windrower platform constructed in accordance with the principles of the present invention but with some drive elements removed for clarity.
Figure 2:
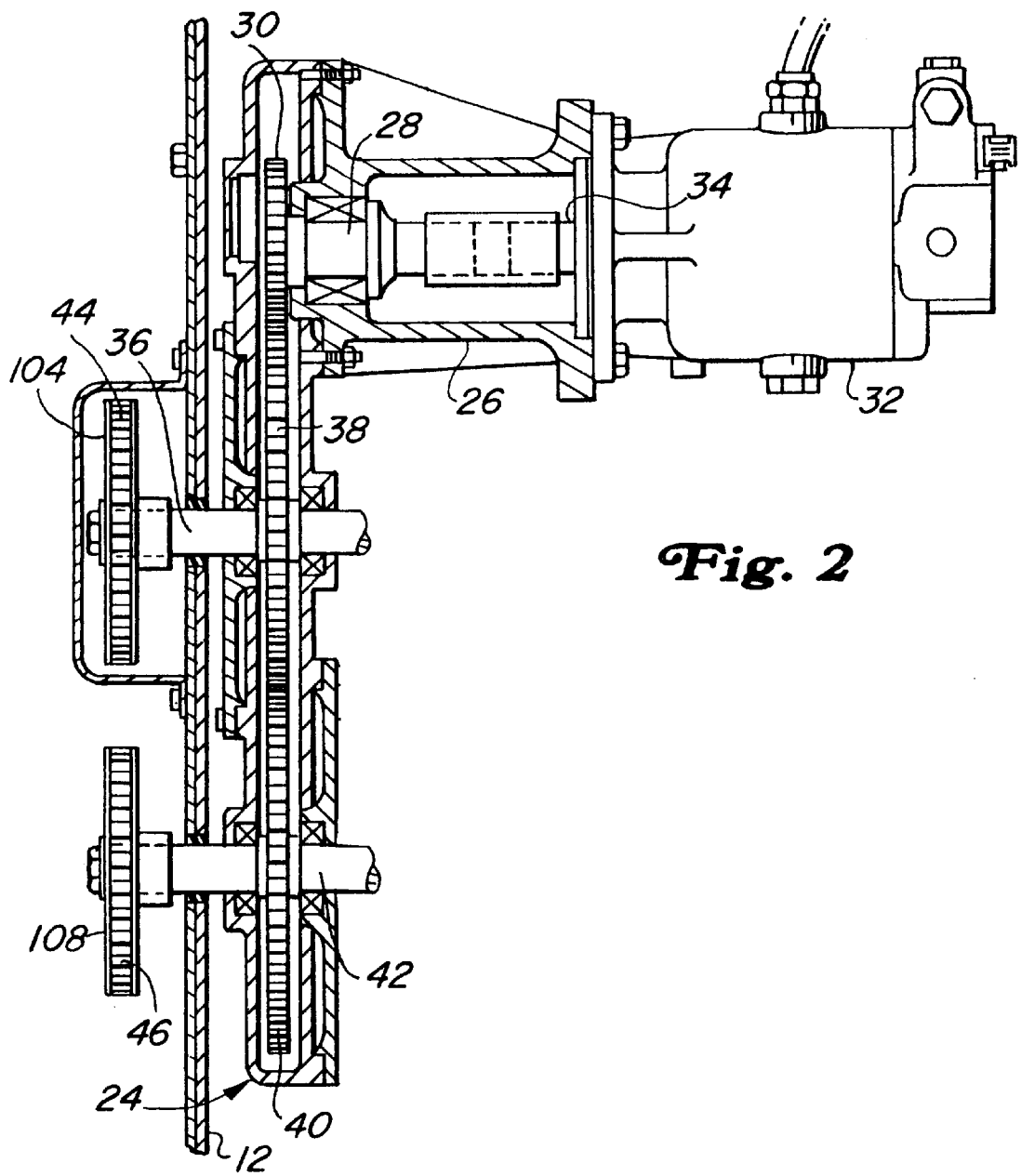
FIG. 2 is an enlarged rear elevational view, with parts in section, showing the hydraulic motor and power distribution gear case through which power flows for driving all of the components of the windrower platform.
Figure 3:
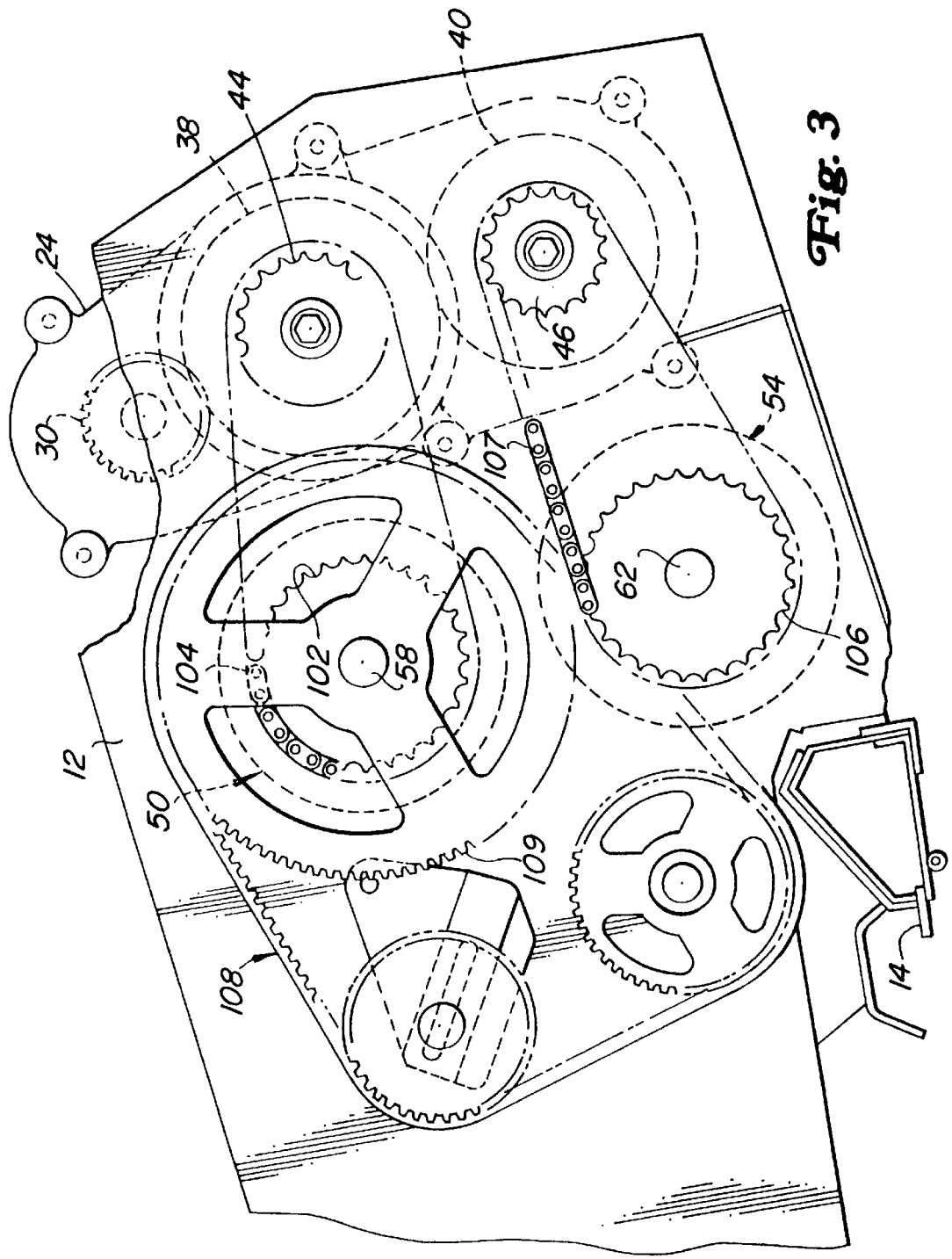
FIG. 3 is a left side elevational view showing the drive connections between the power distribution gear case and the driven elements at the left-hand side of the platform.
Figure 5:
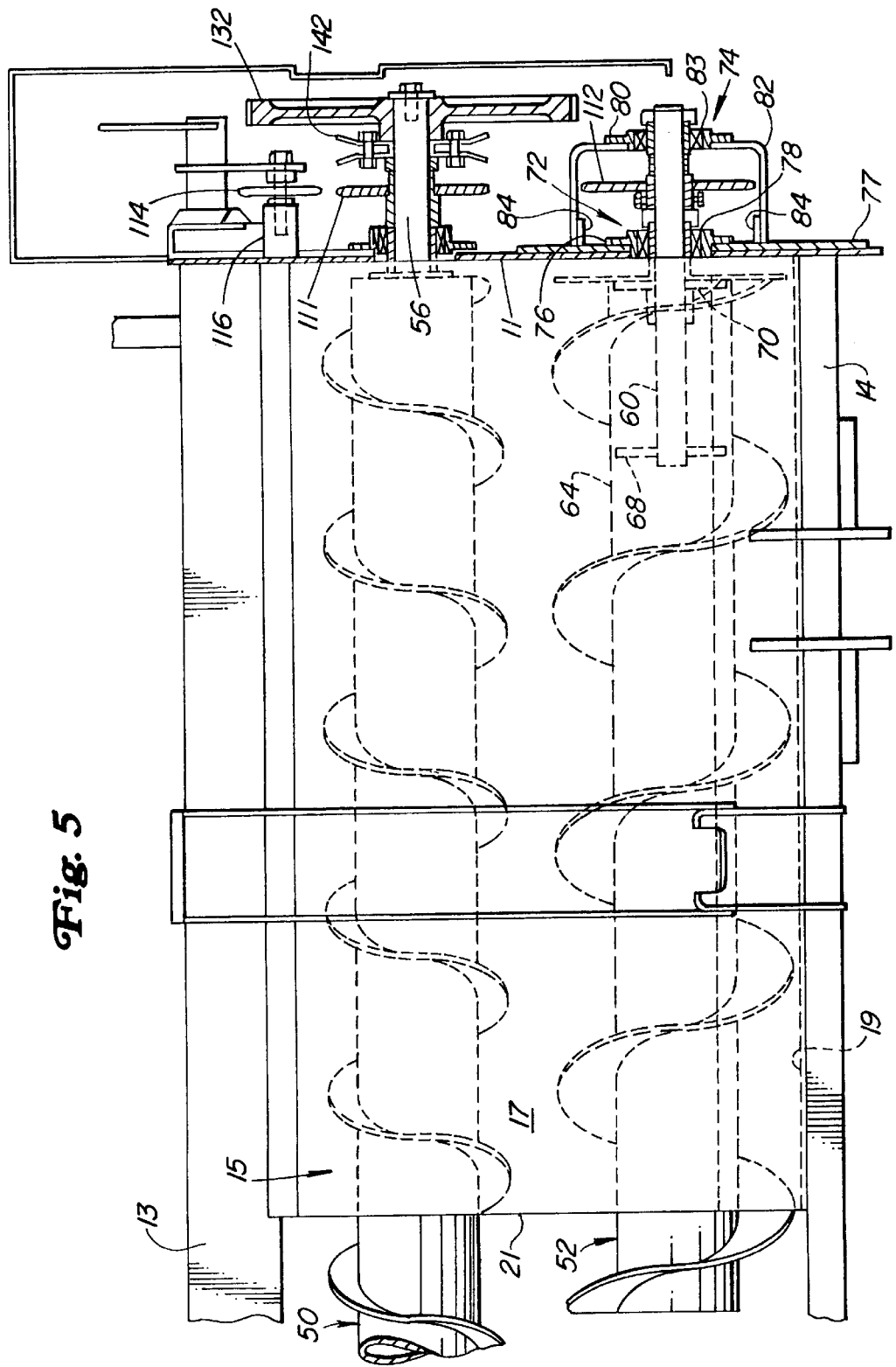
FIGS. 5 and 6 are rear elevational views, with parts in section, respectively showing enlarged right- and left-hand sections of the platform shown in FIG. 1.
Figure 6:
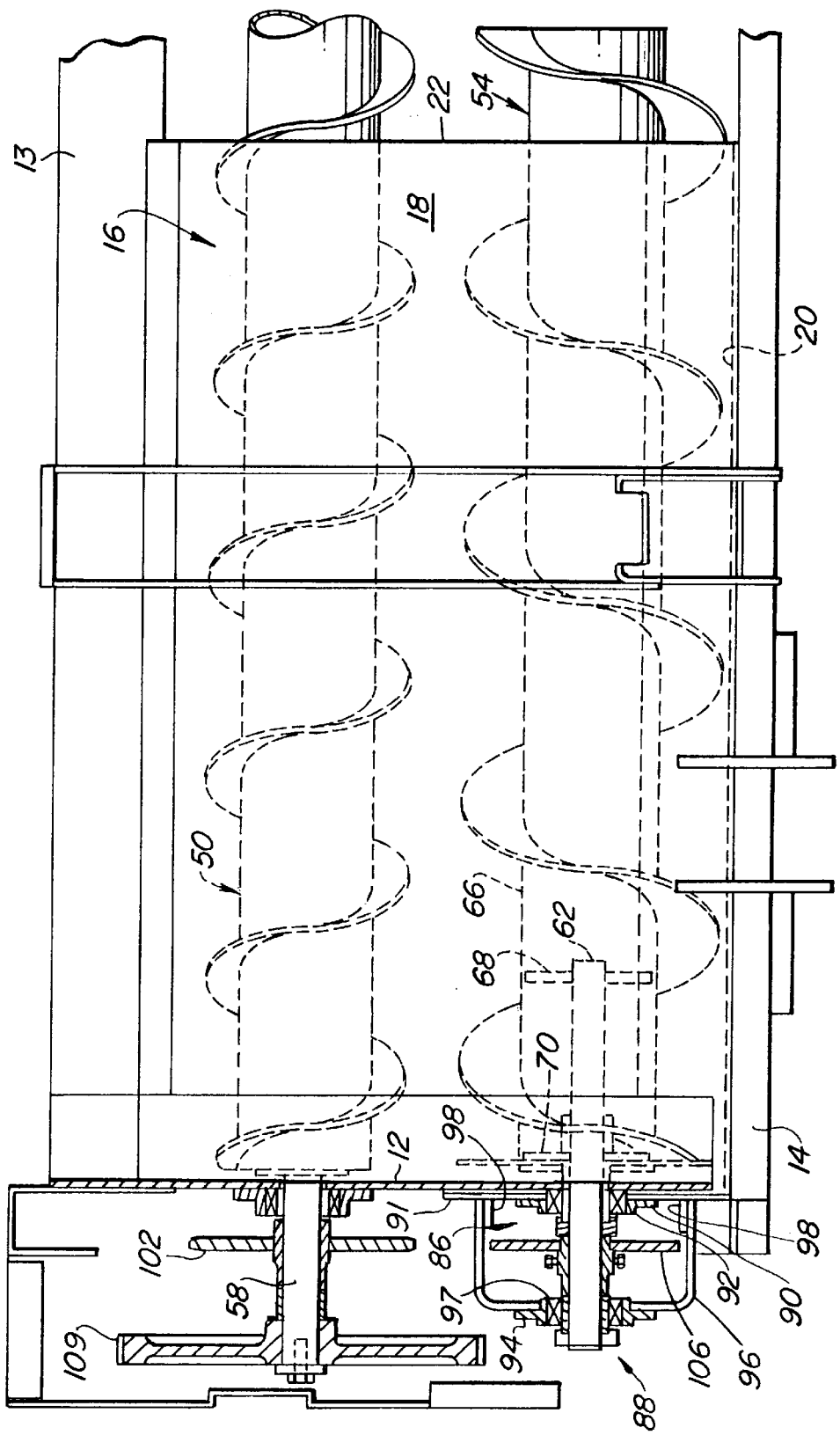

Referring now to FIGS. 1–3, there is shown a harvester platform 10 of the type that is used for cutting and windrowing grain or specialty crops prior to their being processed by a combine or ensilage harvester. The platform 10 includes outer, right- and left-hand side walls 11 and 12, respectively, joined at upper front locations by a knock-down bar (not shown), at upper rear locations by a cross beam 13 and at a lower central location by a sickle cutter bar sill assembly 14. Referring now also to FIGS. 5 and 6, it can be seen that right- and left-hand sheet metal wall structures 15 and 16, respectively extend inwardly from the right- and left-hand side walls 11 and 12. The wall structures 15 and 16 are each-j shaped in side view so as to define respective upright back wall sections 17 and 18, and respective lower auger trough sections 19 and 20 which are arcuately curved and respectively extend forwardly from the bottoms of the back wall sections. The wall structures 15 and 16 terminate inwardly at respective edges 21 and 22 which are spaced from each other to define a central crop discharge zone 23.

As can best be seen in FIGS. 2 and 3, there is shown a platform drive structure including a main power-distributing gear box or housing 24 bolted to an inner surface of the left-hand side wall 12. The gear box 24 is vertically elongated, and, bolted to an inner upper location thereof is a hydraulic motor mount casting 26 containing a horizontal gear box input shaft 28 mounted for rotation about a horizontal axis and carrying an input spur gear 30. A reversible, fixed displacement hydraulic motor 32 is mounted to an inner end of the casting 26 and has an output shaft 34 coupled to the input shaft 28. It is noted that while the motor 32 is preferred for its simplicity, the present invention could just as well be used in conjunction with a reversible mechanical drive. An upper drive shaft 36 extends horizontally through and is rotatably mounted in the gear box 24 and carries an upper drive gear 38 coupled in constant mesh with the input spur gear 30 and with a lower drive gear 40, which is identical to the upper gear 38 and carried by a lower drive shaft 42 that also extends horizontally through and is rotatably mounted in the gear box 24. Respectively mounted to outer ends of the drive shafts 36 and 42 are upper and lower roller chain sprockets 44 and 46.

Figure 4:
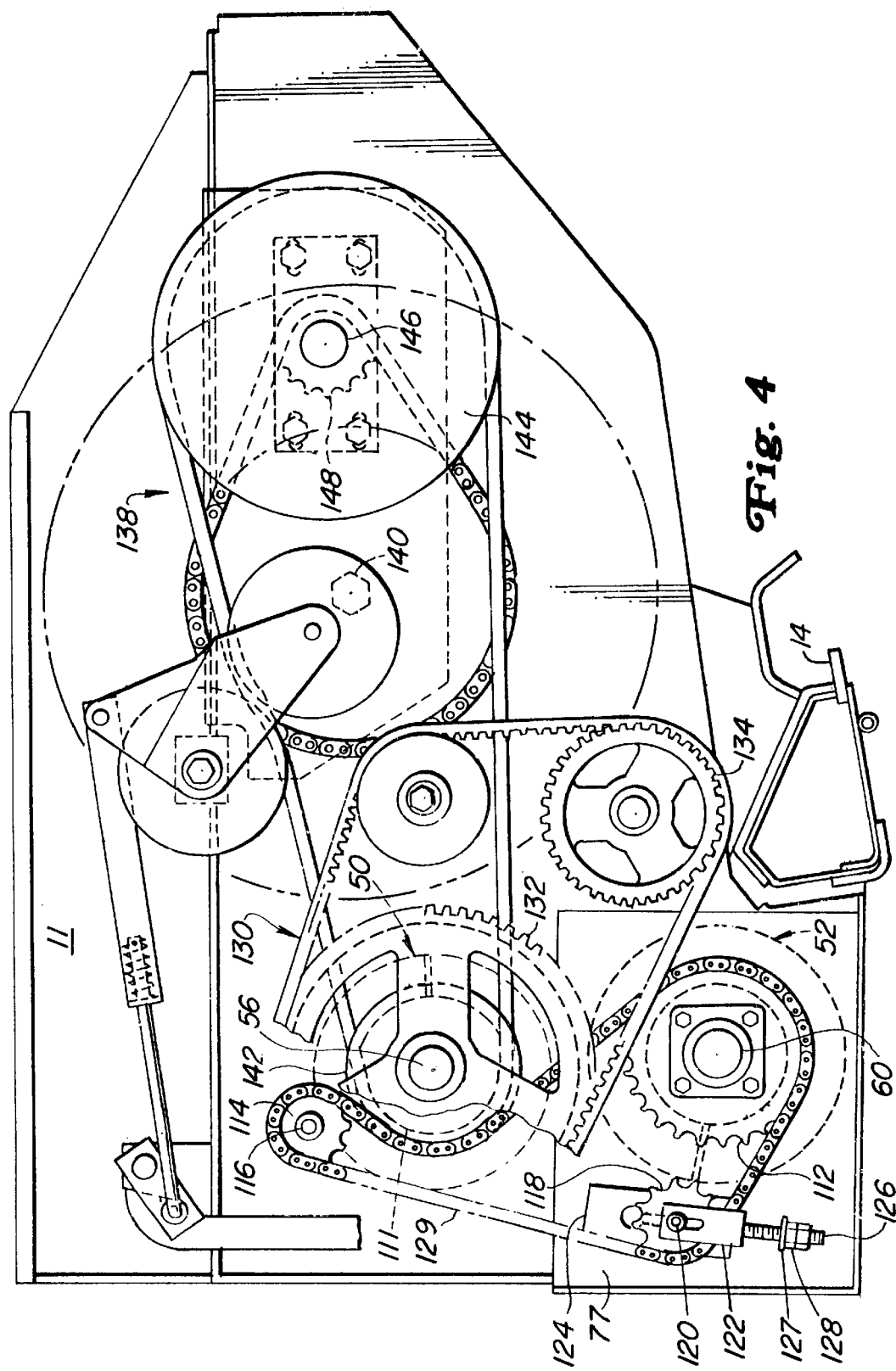
FIG. 4 is a right side elevational view showing the drive connections between the top auger and the lower right-hand cantilevered auger, sickle drive box and the reel.

Clearly shown in FIGS. 1, 5 and 6 are an upper center-feed auger 50, which extends between the side walls 11 and 12, and a lower auger assembly comprising right- and left-hand cantilever-mounted augers 52 and 54, respectively, having lower portions of their respective flightings located within the auger trough sections 19 and 20 throughout the majority of their lengths, but having respective inner end portions extending inwardly beyond the inner wall edges 21 and 22 a short distance into the discharge zone 23. As best can be seen in FIGS. 3 and 4, the upper auger 50 and right- and left-hand lower augers 52 and 54 are located forwardly of the main power distributing gear box 24, with the lower augers 52 and 54 being substantially vertically below the upper auger 50.

With reference to FIGS. 5 and 6, it can be seen that the upper auger 50 has right- and left-hand stub shafts 56 and 58, respectively, rotatably mounted in the side walls 11 and 12. Further, it can be seen that the right- and left-hand lower augers 52 and 54 include respective stub shafts 60 and 62 that are located centrally within respective cylindrical cores 64 and 66 of the augers. Inner and outer circular support plates 68 and 70 are received on and fixed to each of the shafts 60 and 62 and have their outer circumferences respectively fixed, as by welding to respective interior surfaces of the cores 64 and 66. The right-hand stub shaft 60 extends through and rightwardly beyond the right-hand side wall 11 and is rotatably mounted by inner and outer bearing assemblies 72 and 74, respectively. The inner assembly 72 has a flanged bearing housing 76 positioned against an outer surface of a mounting plate 77 bolted against an outer surface of the wall 11. The bearing housing 76 is held in place by bolts extending through the mounting plate 77 and the wall 11, and contains a self-aligning bearing 78. The outer bearing assembly 74 includes a flanged bearing housing 80 bolted to an outer surface of a support structure 82 and contains a self-aligning bearing 83. The support structure 82 is, in turn, bolted to tabs 84 welded to the outer surface of the mounting plate 77. Similarly, the left-hand stub shaft 62 projects through and leftwardly beyond the left-hand side wall 12 and is rotatably mounted by inner and outer bearing assemblies 86 and 88, respectively. The inner bearing assembly 86 includes a flanged bearing housing 90 positioned against an outer surface of a mounting plate 91 that is bolted against an outer surface of the wall 12 and held in place by bolts that extend through the plate 91 and the wall 12. The flanged bearing housing 90 contains a self-aligning bearing 92. The outer bearing assembly 88 includes a flanged bearing housing 94 bolted to an outer surface of a support structure 96 and containing a self-aligning bearing 97. The support structure 96 is, in turn, bolted to tabs 98 welded to the outer surface of the mounting plate 91.

Power for driving the upper auger 50 and the lower left-hand auger 54 is taken directly from the main power distribution drive box 24. Specifically, as can best be seen in FIG. 3, a left-hand upper auger sprocket 102 is fixed on the stub shaft 58 in fore-and-aft alignment with the upper sprocket 44 and is coupled for being driven from the sprocket 44 by a roller chain 104. Similarly, a left-hand lower auger sprocket 106 is fixed on the stub shaft 62 in fore-and-aft alignment with the lower sprocket 46 and is coupled for being driven from the sprocket 46 by a roller chain 107.

A left-hand timing belt drive assembly 108 is provided for transferring power for reciprocating a left-hand sicklebar (not shown) mounted to the sill assembly 14 and includes a toothed belt sprocket 109 mounted to the outer end of the upper auger stub shaft 58 and coupled for driving a toothed belt sprocket coupled to a shaft forming the input of a left-hand wobble drive box 110, visible in FIG. 1.

Referring now also to FIGS. 4 and 5, it can be seen that the lower right-hand auger 52 is driven from the upper auger 50. Specifically, the right-hand stub shaft 56 of the upper auger 50 has a sprocket 111 mounted thereto in co-planar relationship to a sprocket 112 mounted to the stub shaft 60 of the lower right-hand auger 52. Also mounted in co-planar relationship to the sprockets 111 and 112 are an upper fixed idler sprocket 114 that is supported by a shaft 116, fixed to the wall 11, and an adjustable tensioning idler 118 that is mounted for rotating about a bolt 120 extending through the legs of a unshaped carrier 122 and having a shoulder extending through an upwardly oriented, keyhole-shaped slot 123 provided in a web of a support channel 124 having its legs fixed to the mounting plate 84. The bolt 120 has a head which is larger than the width of the narrow part of the slot 123 and located on the opposite side of the channel web from the an adjacent leg of the u-shaped carrier 122. A threaded adjustment bolt 126 extends downwardly through a hole in the web of the carrier 122 and extends through a tab 127 fixed to the plate 84. Adjustment and jam nuts 128 are received on the lower end of the bolt 126. A drive chain 129 is trained about the sprocket 112 and the idlers 116 and 118, and engages the back side of the sprocket 111 so that sprocket 112 and, hence, the right-hand auger 52 is driven counterclockwise, i.e., opposite to the direction of rotation of the upper auger 50 and sprocket 111, as viewed In FIG. 4.

A right-hand timing belt drive assembly 130, like the left-hand timing belt drive assembly 108, is provided for transferring power for reciprocating a right-hand sicklebar (not shown) supported by the sill assembly 14. Specifically, the drive assembly 130 includes a toothed belt sprocket 132 fixed to the outer end of the upper auger stub shaft 56 and coupled by a toothed belt for driving a toothed belt sprocket 134 mounted to an input shaft of a right-hand wobble drive box 136, visible in FIG. 1. The reciprocation of the right- and left-hand sicklebars are thus timed to occur together by the upper auger 50 and the toothed timing belts.

Also located at the right-hand side of the platform 10 is a reel drive assembly 138 for transferring power from the upper auger stub shaft 56 to a right-hand stub shaft 140 of a reel (not shown). Specifically, the drive assembly 138 includes a belt pulley 142 mounted to the upper auger stub shaft 56 at a location between the sprockets 110 and 132, as can be seen in FIG. 5, which is coupled by a belt for driving a pulley 144 mounted on a jackshaft 146, the jackshaft 146 carrying a chain sprocket 148 that is coupled by a chain for driving a chain sprocket located on the reel stub shaft 140.

In operation, the harvesting platform 10 would normally be suspended or linked to either a self-propelled or towed framework for movement across a field containing seed or specialty crop to be harvested. As the platform 10 advances across the field, the hydraulic motor 32 is driven so as to cause the upper auger 50 and the lower left auger 54 to be counter-rotated and the right- and left-hand sicklebars reciprocated such that as the crop is cut and through the action of the reel is swept onto the lower right- and left-hand augers 52 and 54, respectively. The lower augers 52 and 54 operate together with the upper auger 50 so as to convey the cut crop in an even stream to the center of the platform where the crop is deposited on the ground at the discharge zone 23 to form an even windrow. The even feeding of the crop keeps it from bunching and hesitating which prevents it from being continually hit with the reel which would cause seed to be lost. Furthermore, with the windrow being uniform, the combine throughput is uniform resulting in less seed being lost due to thresher cleaning shoe overloads, the absence of such overloads permitting the combine to operate at faster ground speeds. In addition, because the right- and left-hand lower augers 52 and 54 extend only a short distance into the discharge zone 23, there is no central auger section which would tend to wrap with crop as is the case with the full-length lower auger of conventional platforms.

It is to be noted that a platform having upper and lower full-length counter-rotating, center-feed augers can be converted to a platform, such as that disclosed herein, by removing the lower auger and replacing it with right- and left-hand augers and by adding a drive assembly, like that disclosed in FIGS. 4 and 5, for driving the lower right-hand auger in a direction opposite to that of the upper auger, it being noted that the upper and lower left-hand augers continue to be driven just the same as they were in the platform equipped with the full-length lower auger.

Further, it is to be noted that the cantilever mounting of the lower right- and left-hand augers 52 and 54 results in the augers being supported so that no impediment to the flow of crop is presented. Also, the provision of the self-aligning bearing assemblies 72–74 for supporting the stub shaft 60 of auger 52, and the provision of the self-aligning bearing assemblies 86–94 for supporting the stub shaft 62 of the auger 54 makes it possible to accommodate misalignments which might occur due to varying tolerances during manufacture.

What is claimed is:

1. In a crop harvester including a harvesting platform having opposite, first and second side walls, a crop severing device at a front of said platform extending between said side walls, and a discharge zone, of a width considerably less than that of said severing device, located centrally at a rear of said platform, an auger feed arrangement including lower and upper counter-rotating auger assemblies for gathering crop and delivering it to said discharge zone, the improvement comprising: said lower auger assembly being in the form of first and second augers respectively extending inwardly from said opposite, first and second side walls of said platform and having respective inner ends terminating adjacent opposite sides of said discharge zone; each of said first and second augers including a cylindrical, hollow core having a stub shaft extending axially into, and being respectively fixed only to, an outer end portion thereof; first and second bearing supports respectively located outwardly of, and fixed to, said first and second side walls in axial alignment with said first and second augers and having respective support walls spaced outwardly from, and disposed parallel to, said first and second side walls; the stub shafts of said first and second augers respectively extending through said first and second side walls and said respective support walls of said first and second bearing supports; the stub shafts of said first and second augers each having a pair of self-aligning bearings received thereon and respectively mounted to adjacent ones of the first and second walls, and of the support walls, whereby said lower pair of augers are cantilever-mounted from said opposite side walls; and said upper auger assembly being in the form of a single, center feed auger.

2. In a crop harvester including a harvesting platform having opposite, first and second side walls, a crop severing device at a front of said platform extending between said side walls, and a discharge zone, of a width considerably less than that of said severing device, located centrally at a rear of said platform, an auger feed arrangement including lower and upper counter-rotating auger assemblies for gathering crop and delivering it to said discharge zone, the improvement comprising: said lower auger assembly being in the form of first and second augers respectively extending inwardly from said opposite, first and second side walls of said platform and having respective inner ends terminating adjacent opposite sides of said discharge zone and having respective outer ends terminating adjacent said first and second side walls; said upper auger assembly being a single center feed auger having opposite first and second outer ends respectively terminating adjacent said first and second side walls; a drive transmission including a first pair of drive couplings respectively connected to said first outer end of said center feed auger and to said outer end of said first auger of said lower auger assembly; said drive transmission further including a third drive coupling coupled between said second outer end of said center feed auger and said outer end of said second auger of said lower auger assembly, with said third drive coupling being arranged for driving said second auger in a direction opposite to said center feed auger.

3. In a harvesting machine as defined in claim 2 wherein said third drive coupling includes a first sprocket mounted to said second outer end of said center feed auger; an idler sprocket mounted adjacent an upper rear location of said first sprocket, a second sprocket mounted to said outer end of said second auger of said lower auger assembly, a tensioning sprocket located rearwardly of said first and second sprockets and a drive chain trained about said idler, second and tensioning sprockets and engaged with a rear segment of said first sprocket.

* * * * *